United States Patent Office 3,572,298
Patented Mar. 23, 1971

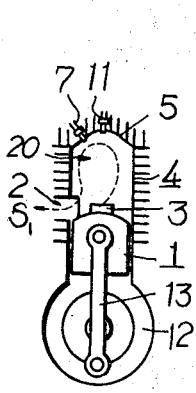
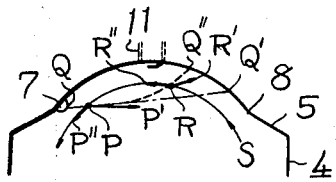
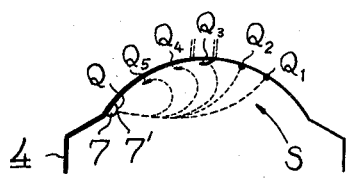
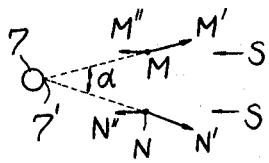
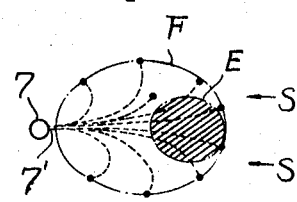
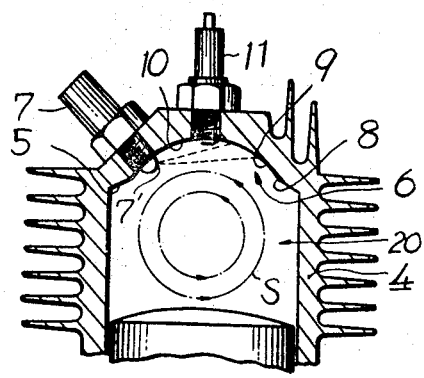
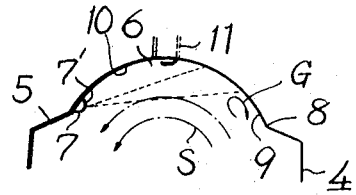
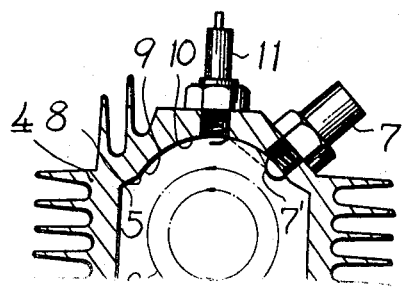
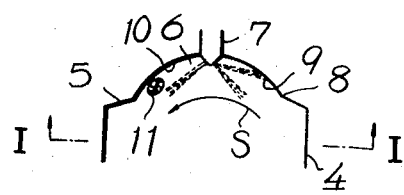

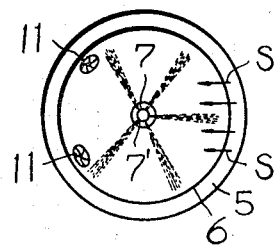
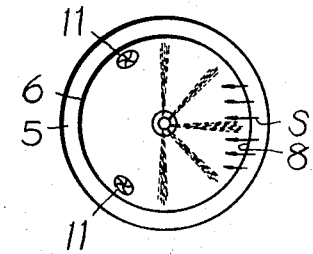
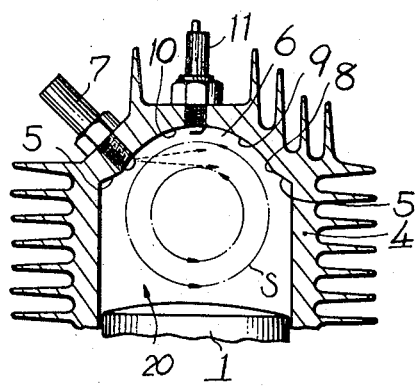
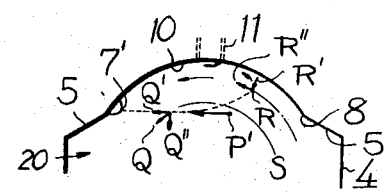
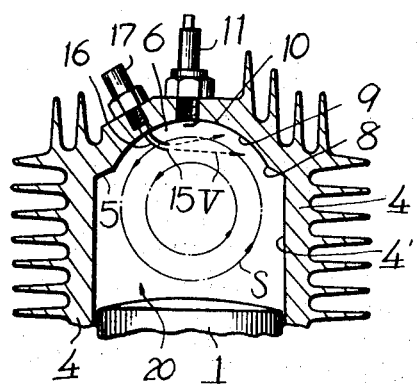
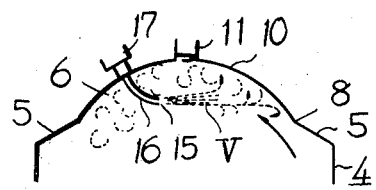

3,572,298
STRATIFIED CHARGE ENGINE
Shigeru Onishi, 31–13 Higashiyama 3-chome, Kanazawa-shi, Ishikawa-ken, Japan, and Saburo Yui, 12–7 Himonya 3-chome, Meguru-ku, Tokyo, Japan
Filed Jan. 6, 1969, Ser. No. 789,227
Claims priority, application Japan, Jan. 8, 1968, 43/599; Jan. 11, 1968, 43/1,083; Feb. 16, 1968, 43/9,413; June 10, 1968, 43/39,424; July 27, 1968, 43/52,757
Int. Cl. F02b 72/00
U.S. Cl. 123—32
8 Claims

ABSTRACT OF THE DISCLOSURE

An internal combustion engine of the stratified charge type wherein the purification of the exhaust fan from the combustion chambers is provided with elimination of noxious components in the emissions thus attaining improved ignitability and combustibility particularly for betterment of performance and durability in full load operation.

DETAILED EXPLANATION OF THE INVENTION

This invention relates to a reciprocating, piston-type internal combustion engine of stratified charge system which achieves charge stratification for complete burning of fuel in the cylinder that serves as combustion chamber, and more specifically to an internal combustion engine of Otto-cycle type for spark ignition of air-fuel mixture, wherein stratified charge combustion is accomplished, that is, stratified charge of a readily ignitable, combustible mixture is burned in the neighborhood of the region including spark plug.

Efforts for improvements of internal combustion engines, especially gasoline engines, have heretofore been directed to higher power output and thermal efficiency and better mechanism. As for the prevention of air pollution due to the exhaust emissions, the manufacturers have simply relied upon some attachments for reductions of noxious gases. However, those emissions containing carbon monoxide, CO, hydrocarbons, HC, and nitrogen oxides, NOx, have so rapidly increased in recent years that the control and removal of such noxious substances posing public hazard, or production of cleaner exhaust gases, has come to the fore as a problem of paramount importance that must be solved even at some sacrifice of the power output, thermal efficiency and other features of the engines.

As is well known, it is important in the combustion chambers of internal combustion engines that injected fuel, either mist or vapor in form, be thoroughly mixed with a necessary amount of air for perfect burning. The perfect combustion within the engines incorporating an improved system of charge stratification in the combustion chambers would give cleaner emissions. If the engines are moreover equipped with means for purifying the exhaust with any improvement rather than sacrifice of the engine performance, the result would then be more than satisfactory.

It is known that, in conventional gasoline engines, the concentrations of such noxious gases can be invariably reduced to by far lower levels by effecting good combustion of mixtures at sufficiently lean air-fuel ratios for the control of the harmful emissions.

Generally, a decrease of fuel supply with respect to a given air intake improves the fuel consumption although the engine develops less power. With leaner air-fuel ratios, however, the fuel consumption is increased and thermal efficiency is affected adversely because of slower burning rates and higher occasions of misfiring due to rarefied and deviated mixtures with each cylinder. Thus, fuels burned at excessively lean air-fuel ratios produce only poor thermal efficiency and output, and the clean mixtures slow down the flame propagation, as physical phenoma of inevitable nature. The use of a lean air-fuel ratio thus causes a drop of burning rate, which in turn results in the rise of exhaust temperature, and hence damage to the exhaust valve, irregular combustion cycle, engine roughness, insufficient output, poor acceleration and difficulty of starting. It is for these reasons that the use of lean air-fuel ratios has not been contemplated in the past.

More recently, as part of attempts for making use of lean air-fuel ratios, a number of proposals have been made along the stratified charge concept whereby a spark plug is provided in a part of main combustion chamber or in an auxiliary chamber, and a gaseous mixture of combustible range is formed, ignited and burned, and then the combustion of a leaner mixture in the rest or whole of the main cylinder is effected. It is known that, according to this stratified charge system whereby the engine is operated on a relatively rich fuel mixture maintained in the region around the spark plug and on a lean overall mixture provided in the entire space inside the cylinder (i.e., with excess air), it is made possible to improve the specific heat of active gas for a closer approach to an air cycle, prevent heat dissociation, and reduce the cooling heat loss to the surroundings, so that improved thermal efficiency and reduced fuel consumption can be realized and, further, because the combustion is effected with ample supply of air, the noxious components of exhaust emissions can be fairly reduced.

However, while many versions of the stratified charge concept have been studied and developed up to now, none of them has attained a satisfactory degree of perfection for the control of noxious contents of exhaust emissions as well as in the usefulness in actual applications because of imperfection in design and controllability, complicacy and other problems in construction, etc. Especially, it is practically much more difficult to maintain an air-fuel ratio greater than 15:1 which corresponds (approximately) to the theoretical mixing ratio, or between about 16:1 and 17:1 which is generally believed feasible, in every cylinder of the engine, throughout the entire load range. Moreover, the higher the air-fuel ratio the slower the combustion rate and the higher the exhaust temperature. This tends to invite troubles in the exhaust valve system, increased unsmoothness of combustion process, engine roughness, and frequent occurrence of misfire, which in turn results in difficulty of starting and drop of acceleration. What is worse, the air-fuel ratio in this range can increase the emission of NOx to a maximum. If the compression ratio is increased for better performance, the NOx emision will further increase. In order to reduce the latter possibility, attempts have hitherto been made only at some sacrifice of engine performance. Retardation of ignition timing is an example. However, this results in a drop of power output and a rise of exhaust temperature.

Recirculating a part of exhaust gas to the intake side proves effective but it again reduces the available power, and use of a very rich mixture to make up for the power loss leads to increased CO emission. As a whole, therefore, this approach is not contributory to the purification of exhaust emissions.

Charge stratification is beneficial for the improvement of thermal efficiency at part-load operation, but for an engine to run under full load it fails to ensure good gassification and mixing of fuel with air so that the engine can yield sufficiently high power. In order that the system can meet the requirement of engines operating at full load, it is necessary to inject the fuel rapidly with an injection pump into the cylinder while it is fully open and provide means for adjusting the injection timing that is capable of varying the vaporizing and mixing time over a broad range. To prevent emission of the noxious contents of exhaust (i.e., the three constituents above mentioned) from the combustion chamber notwithstanding these additions is almost impossible. Among other disadvantages is an inevitable increase in equipment cost.

Stratified charge engines thus far developed not only require expensive attachments of complicated designs but involve difficulties in achieving accurate and effective charge stratification at all loads, with lack of stability in the charge obtained, and thus they have failed to display performance well comparable to those of conventional internal combustion engines.

According to one version of the stratified charge system, a recess is formed in the piston crown and fuel is directly injected therein for vaporization and stratification. This naturally increases the thermal load upon the piston, renders the temperature control and hence cooling difficult, and may shorten the piston life. In addition, the extra weight that is inevitably given to the reciprocating part because of the special construction hampers the high-speed operation of the engine and makes it impossible to improve the performance such as the power output. Other disadvantages includes a drop of scavenging efficiency because the recess in the piston crown serves as a dead space.

The present invention has for an object to prefectly achieve the purification of exhaust from the combustion chambers of reciprocating, piston-type internal combustion engines without allowing noxious components to appear in the emissions and also to permit remarkable improvement of performance in operation with no sacrifice of engine output and other features.

It is another object of the invention to eliminate the disadvantages of ordinary stratified charge systems that hinder the successful commercialization of the concept and to enable conventional engines to achieve stratification of mixed charge stably and positively at entire load range without the need of any special, expensive attachments, and attain improved ignitability, combustibility and controllability which all combine to contribute to the betterment of overall engine performance, particularly for the improvement of both performance and durability in full-load operation.

Another object is to provide an internal combustion engine having a single combustion engine which is defined between the cylinder and piston in which fuel is directly injected for effective charge stratification, so that a desirable mode of combustion is easily attained by cleverly taking the advantage of the self-circulating property of exhaust without imparting any special directionality to the air and inducing any air swirl around the center axis of the cylinder, and also by utilizing the scavenging air stream that is naturally produced in the exhausting, charging and compression strokes of the piston, thereby to simply achieve complete combustion of the fuel in order to permit the simultaneous control of the three noxious pollutants which pose social hazard.

Another object is to secure operations over a broad range of loads at a lean overall air-fuel ratio by attaining stratification of charge which may be spread over the cylinder head by the resulting force of a swirling air stream in the combustion chamber of cylinder and the movement of mist from the spray nozzle fitted to the cylinder head, thereby ensuring further stability of charge, with no attempt to create any special swirl stream for the stratification but injecting the fuel against a swirling air stream based on the consequent loop type scavenging air stream and its conservation of momentum so as to form stratiform clouds by dispersion, mixing and evaporation and, at the same time, to increase the air proportion on the outer side and increase the exhaust composition on the inner or concentric side, and maintain this relationship, and further effect matching of the charge of air with the combustion process or, in other words, to materialize stable stratified charge by obtaining a rich mixture on the circumferential side and a lean mixture in the concentric side.

Another object is to provide an internal combustion engine capable of maintaining sound burning conditions over the range from idling to full-load operation by the injection of fuel from a suitable position at a suitable angle against the scavenging air stream or a swirling air stream based thereon in the cylinder of an ordinary valveless 2-cycle engine, thereby realizing positive and stable stratified charge which can be spread over the inner surface of cylinder head by the resulting action of the composite stream with the swirling air and the motion of atomized particles, and extending the mutual tolerance of injection and firing.

Another object is to provide a stratified charge engine which dispenses with the valve mechanism of internal combustion engine and can easily pick up speed without valve hunting that is otherwise inevitable, has the effect of evaporation and cooling due to direct fuel injection during the compression stroke of piston, and shortens the residence time of mixture in the hot cylinder to avoid heating of the intake manifold, thus with the improvement of so-called mechanical octane number permitting an increase of the compression ratio to a fairly high level so that the engine can exhibit performance well comparable to conventional engines in full-load operation.

Still another object is to provide an engine of stratified charge system but wherein the ignition and combustion of fuel mixture are not effected simultaneously with the injection of fuel and, notwithstanding the restriction of octane number, the fuel is injected at a certain crank angle before ignition with allowance of time for evaporation, dispersion and mixing, that is, utilizing the swirling air stream based on scavenging air in the cylinder the fuel is injected thereagainst from a suitable position at a suitable angle thereto so as to form a stratified charge spread over the inner surface of cylinder head by the composite action with the swirling air stream, thereby permitting full use of air and making it possible to avoid a smoke limit, give a configuration insensitive to poor atomization, provide a timing allowance for fuel injection and firing, improve the durability and controllability, contribute to noise control by virtue of the omission of valve mechanism and the driving and transmission means therefor, and also attain improved engine durability and reliability.

Yet another object is to provide an internal combustion engine of simple and compact construction wherein the mass of atomized fuel particles injected into the combustion chamber of the engine is combined in optimum conditions with the scavenging air stream or swirling air stream based thereon so that the mixture containing the fuel particles can be thoroughly spread over the entire corners of the inner surface of cylinder head by making most of the correlative action of the particle mass with said air stream, and an extension is formed on the cylinder head that protrudes toward the scavenging air stream in such manner as to provide a thick boundary layer downstream therefrom or to produce a zone of turbulent flow by the partial removal therefrom, so that an appropriate concentration distribution of stratified charge and a gas stream condition favorable for flame propagation can be realized by the correlative action of the air stream with any one or a given combination of the spreading of atomized particles, localized mixing and propagation of burning flame, thereby to obviate the drawbacks of high fuel consumption and inadequate flexibility as have been observed with the conventional homogeneous mixture system, and achieve remarkable improvements for low fuel consumption, high power output and high response.

A further object is to provide at low cost an economical stratified charge engine which can be of throttleless design having a cylinder head of semipherical contour for defining the combustion chamber and also having a recess from the inner wall surface for inhibiting wasteful dispersion of the atomized fuel particles, wherein charge stratification is accomplished by the correlative movements of fuel with the scavenging air stream or a swirling air stream based thereon, and which is designed to serve as an evaporating section thereby to ensure good startability and is provided with a piston which is lightweight and adapted for high-speed operation so that it can combine these features with improved thermal efficiency or mean effective pressure to contribute to an increase in the specific power output of the engine.

In order to achieve the foregoing objects, the present invention in essence provides an internal combustion engine of stratified charge system comprising a reciprocating piston, a cylinder having an exhaust port and a scavenging port adapted to be opened or closed by the movement of the piston, and an injection nozzle provided in the cylinder head for the supply of fuel into the cylinder, in such manner that the spray from the injection nozzle mounted in the cylinder head is directed toward the inner surface of said cylinder head against or into a swirling stream of fresh air to provide a combined action for stratification of the combustible mixture along the wall surface of the cylinder.

An important feature of the present invention is to provide an internal combustion engine of stratified charge system designed for loop or cross scavenging, including means for directing a mass of fine atomized particles of liquid fuel or a jet of gaseous fuel injected from a fuel injection nozzle mounted in the cylinder head constituting a combustion chamber into the scavenging air stream or a swirling air stream based thereon or both in the cylinder, and for spreading, by the combined action, the fine particles or gaseous mixture formed by evaporation thereof to a stratified form over the inner surface of the cylinder head for subsequent ignition.

Another important feature is the provision of a reciprocating piston-type internal combustion engine of direct injection system, wherein a combustion chamber is defined between the cylinder head of a cylinder accommodating a piston and the piston head and a squish flow formed by the inner surface of the cylinder head and the top surface of the piston head is superposed and combined with the scavenging air stream or a swirling air stream based thereon in the cylinder so that the gaseous mixture of fine particles of injected fuel and the gas formed by evaporation thereof can be dispersed, rarified or concentrated, or the air stream is given a localized flow or turbulence, thereby to attain a desired state of stratified charge suitable for combustion.

Another feature of the invention is that the internal combustion engine of loop or cross scavenging type thereby provided includes means for directing the mass of fine injected particles from the fuel injection nozzle provided in the cylinder head to a cavity formed in the cylinder head thereby dispersing the mass of particles before it is fed in and mixed with the scavenging air stream or swirling air stream based thereon or both in the cylinder, so that a combustible mixture can be stratified and mixed up along the cylinder wall.

A further feature of the invention is that, in the engine thereby provided having an injection nozzle in the cylinder head for supply of fuel into the cylinder, the cylinder head has an inner wall surface of curved contour, e.g., of semispherical section, and is further formed with a cavity in the already curved inner surface, and means is provided to permit direct injection of fuel from the injection nozzle against the cavity to avoid wasteful scattering of the atomized fuel particles and effect the dispersion and mixing of the fuel with air within that region, and stratify the combustible mixture in the combustion chamber by any one or a given combination of the actions of dispersion and mixing, stratiform stabilization and carrying of the fuel particles by the scavenging air stream or swirling air stream produced by the reciprocating piston in the cylinder, and then burn the mixture in stratified state thus permitting complete combustion.

In accordance with the present invention, fuel supplied to the engine is readily spread in the region of cylinder head and eventually carried away by the main stream of swirling air. Since the main stream possesses a field of centrifugal force, the fuel is moved under the mixed action of centrifugal force and turbulence. Attendant, induced stream of localized air flow accompanying the injection of the mass of fine atomized fuel particles also contributes effectively to the spreading and turbulent actions. Moreover, the fine particles injected out of the nozzle is exposed to the air stream flowing at a relatively high speed, which combines with the gradual increase of air temperature due to the progress of compression stroke to give a good fuel and air mixture. This mixture rides on the swirl in the cylinder and is stratified with concentrations such that the mixture is relatively uniform along the inner wall surface of the cylinder head but becomes gradually leaner away from the cylinder head surface. Charge stratification is thus accomplished effectively and positively, which provides remarkably good adaptability to the air drawn in the engine. To cite the region outside of the scavenging air stream, such as the region near the cylinder, as an example, a good rate of scavenging is attained close to the inner wall surface of the head while the rate drops toward the center of the cylinder where an increased amount of residual gas components of the preceding stroke is left. When charge stratification is carried out in such manner as to form a rich mixture in the region outside of the main stream of the swirl, the charge composition is stable and the air supply is well balanced with the air consumption.

Also, because it is possible under the invention that the combustible mixture is stably spread over an extensive region on the inner wall surface of the cylinder head and the mixture is retained for a relatively long period in the cavity space, the allowance for change of spark angle relative to the timing for fuel injection is rendered large enough to permit fairly free selection of the spark timing independently of the injection timing. This tendency becomes more pronounced with the temperature rise of the head. Fuel particles injected from the orifice of the injection nozzle are spread and evaporated while approaching the inner wall surface of the head except for the state in the very early period and, as a whole, the swirling velocity inside the cylinder is adequately slowed down to permit charge stratification of a desired intensity and richness to be realized with ease.

The air-fuel mixture containing the injected fuel particles and the fuel evaporated from the inner wall surface of the cylinder spreads well to every corner of the combustion space and from surface of particles and the densities of the particles and mixture per unit volume do not reach any appreciably high values. These factors combine together to preclude the possibility of misfiring due to a too high concentration around the spark plug upon the introduction of excessive fuel. Even in part-load operation with meager fuel injection, a sufficient air-fuel ratio is maintained in the combustion ignition zone for preclusion of misfire, delay in combustion or other trouble with a fairly lean overall mixture. The fact that good combustion is thus obtained over the no-load to full-load range and particularly in part-load operation with excess air supply affords tremendous practical benefits because, for automotive engines, the specific fuel consumption in the part-load region where cars are mostly driven is considerably improved and, moreover, purification of exhaust gases is achieved positively to solve the problem of public hazard due to air-polluting emissions easily and without resort to any complicate, expensive additional attachment for that purpose. Still more, direct fuel injection provides powerful acceleration, good fuel distribution and adaptability to high-output performance.

According to the present invention, fuel can be readily fired either by the mass of fine atomized particles of injected fuel or by the gaseous mixture consisting mainly of the vapor from the atomized fuel and the liquid film deposited on the inner wall surface of the cylinder, or by the mixture of the two. The firing flame considerably promotes further evaporation. After firing, the combustion gas which is light in weight naturally runs toward the center of the main stream of swirl, and is replaced by fresh air, which in turn takes part in the formation of a mixture and in subsequent combustion. With such mechanism of combustion, it is possible to accomplish the fuel injection with somewhat high pressure in order that firing and combustion be primarily initiated by the mass of fine atomized particles at the time of starting and immediately after the starting when the cylinder temperature is low, and to decrease the injection pressure upon the rise of the cylinder temperature to a suitable level thereby to lessen the burden on the injection pump, and then to enable the mixture of vaporized fuel and air to take over the task of firing and combustion from the mass of fine atomized particles so as to ensure satisfactory combustion and operation.

In the combustion mechanism in accordance with the present invention, the rate and highest temperature of combustion can be controlled partly because the mixture contains some residual gas (i.e., inactive gas) already burnt in the previous stroke and partly because the residual gas is more densely distributed in the central zone than in the rest. Consequently, the pressure rise rate may be kept lower than in the conventional 4-cycle engines which burn homogeneous mixtures, and the maximum pressure inside the cylinder may also be reduced so as to provide a lighter engine. It is further possible to minimize the development of noise and thereby expect smooth engine operation. The arrangement is very contributory to the control of NOx emission which is a source of public hazard. Since the fuel is fed by direct injection into the cylinder and the residence time in the cylinder in the form of unburnt mixture is shortened, the anti-knock property of the fuel is strengthened. Further, because there is no exhaust valve and other member which can serve as heat source, for example in the vicinity of the cylinder head, and because the combustion chamber is formed to a semispherical shape which is compact and close to an ideal configuration, the mechanical octane number of the fuel is increased and an improved thermal efficiency is realized by dint of an increase in the compression ratio. The moderate pressure rise rate and relatively low maximum pressure permit the use of lightweight moving parts and a quiet high-speed operation, thereby rendering it possible to expect an increase of the specific power output of the engine.

Under the invention, combustion is achieved by particles and mixture spread over the entire region along the inner wall surface of the cylinder head, and therefore the heat load on the engine is heavy for the cylinder head and relatively light for the piston, the moving part. This is highly beneficial for the cooling of the piston and for the lubrication of the sliding surface of the piston with respect to the surrounding wall of the cylinder. On the other hand, the stationary head that is subjected to a great heat load can be cooled with relative ease from the outside, and thus the temperature control is made easy. Ample allowance for ignition timing brings about a stable and practically useful stratified charge, and permits operation at a lean overall air-fuel ratio. With the foregoing merits the engine may dispense with the throttle at remarkable advantages of improved thermal efficiency and reductions of noxious contents in exhaust emission in the part-load operation.

Although excess air used in accordance with the invention decreases the combustion temperature, it on the other hand improves the specific heat ratio of the active gas, decreases the cooling heat loss to the outside and reduces head dissociation due to combustion. These lead to an improvement of thermal efficiency and a sharp reduction of the carbon monoxide, CO, percentage in the exhaust by virtue of excess air. Furthermore, the presence of excess air, no possibility of wasteful scattering of the fuel particles, and stable charge stratification all combine to avoid the extension of the zone wherein the mixture becomes too lean to burn. This in turn reduces to an appreciable extent the emission of hydrocarbons, HC, in the exhaust due to incomplete combustion, maintains the combustion temperature at a low level, and keeps the combustion temperature and the maximum pressure during combustion at moderate levels with an air-fuel ratio generally lean enough to fall in the misfiring zone. By dint of the self-circulating property of the exhaust which is inherent to the inactive gas and also by the fact that the distribution factor in the flow pattern of the exhaust is high in the central region of the combustion chamber, the production of nitrogen oxides, NOx, (especially in the high-temperature zone in the center of the combustion chamber) can be reduced adequately. It is particularly worthy of note that, in the engine according to the present invention, the combustion temperature in the central region of the combustion chamber is effectively kept low because of the relatively high percentage of the residual gas already burned during the course of the previous stroke in the central region of the cylinder and consequently an overall purification of the exhaust is made possible without an attendant drop of the engine output.

Further, because it is contemplated in accordance with the invention that the cylinder head region of the engine not only accomplishes the charge stratification but serves also as an evaporating region, the temperature control is made extremely easy, and there is no burden in the least that should be borne by the piston, but rather more of the stratified charge is spread and burned along the inner wall surface of the cylinder head, thereby lessening the heat load upon the piston. Thus, an internal combustion engine generally of the 2-cycle design wherein the reciprocating parts have no extra weight and are light enough for high-speed operation and are therefore contributory to improved mean effective pressure and increased specific engine output, can be provided with a simplified construction and at low cost.

Since the engine according to the present invention solely depends on the combustion in a main combustion chamber of simple design, it is free from the complicacy of the ordinary stratified charge engines equipped with an auxiliary chamber. It dispenses with usual communication passages which cause additional heat loss, and it has a less overall wall surface area. The engine of the invention produces no combustion noise which is often inherent to split type combustion chambers. For the same reason, it is free from any dead space for scavenging which is frequently formed in combustion chambers defined by pistons having a pocket or cavity thereon. Thus, there is nothing which applies extra burden on the structure, or in terms of weight or heat load, with the result that the scavenging effect and gas-replacing effect are remarkably improved. Fuel injection is not directed to the sliding face of the cylinder nor to the piston but is temporarily retained in the cavity where it is not directly exposed to the main air stream and thus the injected particles are atomized to minute particles. Accordingly, the atomized particles in a desirably stratified state are carried by the main air stream by the combined action with the scavenging air stream or a swirling air stream based thereon or an air stream saddled thereon. In this way stratification is stably accomplished. There is no possibility of the atomized particles being directly shot against the sliding wall surface of the cylinder, and thus the troubles which often occur on the lubricated surface due to direct fuel injection in the cylinder as in conventional engine can be precluded. In addition, it is possible to omit the throttle for air intake as a stratified charge engine or, even if the throttle is provided, the dependency on the throttle can be remarkably lessened. This characteristic may be fully exploited from a different point of view. For example, in a crankcase compression type engine, the suction and compression works in the crankcase may always be kept above certain values regardless of the operating condition. If necessary, by cutting off the fuel injection during the course of deceleration and increasing the compression work in the crank-case by opening the air throttle, it is possible to obtain the effect of engine brake, so that the disadvantage of insufficient engine brake for a conventional 2-cycle engine can be readily improved at an advantage.

In the present invention a swirling air stream based on the scavenging air in the cylinder of an ordinary valveless 2-cycle engine is utilized and fuel is injected against or in the direction of the swirl from a suitable position at a suitable angle thereto and, by the combined action with the swirling air stream, the mixture is spread along the inner surface of the cylinder head to achieve charge stratification. By so doing it is possible to use not only gasoline but other lower grade fuels such as kerosene and light oil and gaseous fuels such as propane, depending on the combustion mechanism and the course of mixing process. This system is as effectively applicable to 4-cycle engines that have the scavenging behavior of 2-cycle engines. There is no need of adjusting means for maintaining the mixing ratio of air intake constant as is required by conventional engines. Fuel alone can be regulated independently of air supply while the air intake is kept open, and the controllability is simplified. Since the fuel is directly injected into the cylinder, instead of being fed to the suction inlet of the engine as is usual, there is no possibility of declining the suction volume efficiency of the engine, and gaseous fuels may be used with no decrease of the power output as compared with liquid fuels. Further, the time during which the fuel remains as unburned mixture in the cylinder is shortened, and this, coupled with the inherently high anti-knock property of LPG gas, ensures improved thermal efficiency due to the rise of compression ratio and renders it possible to expect an increase of the power output.

Moreover, according to the present invention, the fine atomized particles of injected fuel or a misty mixture of the vapor thereof is ignited, and therefore the engine not sufficiently warmed up or still cold can be started without difficulty. Thus, the engine is suitable for cold start and exhibits good firing and combustion process under any load condition. The mode of combustion is in most cases such that the flame propagation of the vaporized mixture is combined with the spreading and combustion of fine fuel particles and accordingly the pressure rise rate is relatively low, and a quiet internal combustion engine with least operation noise can be obtained.

In the cylinder of the engine, steady stratified charge is provided under optimum conditions, and therefore not any critical relationship holds between the fuel injection and scavenging air stream and a broad allowance is provided for the crank angle over the range from the vicinity of the bottom dead center of the piston to the compression stroke. The same is true of the fuel injection versus the ignition timing. For example, while the initiation angle of fuel injection is varied from 140 deg. ahead of the top dead center to 80 deg. ahead of the same center, i.e., over a range of 60 deg. in terms of the crank angle, the ignition timing may be varied independently thereof and the ignition and operation are made possible without any undesirable outcome, over a range from about 40 deg. ahead of the top dead center to a point past the said center, though it is accompanied by some fluctuations of the maximum pressure and mean effective pressure. (This has been confirmed experimentally.) For the practical purpose, fuel injection and ignition may be controlled independently of each other to a considerable extent. There is no limitation of hardly adjustable, critical relations among the three requirements of air swirl, fuel injection and ignition as observed in conventional stratified charge engines. In this sense, the engine may be handled almost like an internal combustion engine of electric ignition type and, in addition, can be operated rationally by varying the above factors over extensive ranges.

In accordance with the present invention, operations with excess air, particularly at very lean air-fuel ratios, are possible without troubles. It is for this reason that there is no necessity of air-throttle adjustment in the part-load range or, if any, the dependency upon such adjustment is reduced. This also serves to improve the thermal efficiency and reduce the noxious contents in the exhaust in the part-load operation. Over the extensive load range from non- to medium-load, the fuel consumption rate of the engine according to the invention is close to that of diesel engines commonly in use. Under full-load conditions, it can exhibit the ordinary fuel consumption trend of gasoline engines. Thus, a remarkable improvement in performance is possible for a gasoline engine using spark ignition system. As an automotive engine, for example, the engine of the invention can display not only smooth operation characteristics with the specific power output inherent to the gasoline engine but also fuel economy and exhaust purification almost as satisfactory as the existing Diesel engines and yet without the smoke characteristic of the latter.

Further, the present invention provides an engine capable of attaining all the more stabilized charge stratification, broadening the range of mutual tolerances of fuel injection and ignition, securing steady and favorable functioning and efficiency of the engine, and still ensuring realization of clean exhaust emissions. Since the charge thus stratified is such that the mixture is richer and the specific gravity per unit volume of the mixture is larger toward the peripheral region, the balance between fuel supply and air intake is naturally maintained favorably. The process of motions is stabilized and the mixture flow is relatively moderate in the vicinity of the spark plug. There is no possibility of the flame being extinguished. Further, owing to the generally ideal contour of the combustion chamber, the fluctuation of combustion cycle is limited. These all lead to the conspicuous advantage of positive materialization of performance improvement and reduction of unburnt hydrocarbons in the exhaust.

Since the stratified charge is formed in the combustion chamber of the engine and the combustion process does not rely on the instantaneous timing of fuel injection and ignition with respect to the air swirl as in the conventional stratified charge engines, a very large allowance is provided for the timing of fuel injection and ignition in accordance with the present invention. Accordingly, the timing for fuel injection and firing can be set freely and independently of each other to a considerable extent. For example, it is possible to fix the fuel injection timing and change the lead angle of ignition alone. This eliminates the cumbersomeness of control in the ordinary stratified charge engines.

In the practice of the present invention, the wide allowance between the fuel injection and ignition and formation of air stream also provides a fairly high degree of flexibility against inadequate injection conditions such as clogging of the injection nozzle for fuel supply. Thus, minor deterioration of the injective conditions cannot have an appreciably adverse effect upon the performance, and it is another factor contributory to the improved reliability of the engine. As a result, the timing for the initiation of fuel injection can be fully advanced and the effective injection crank angle can be increased thereby to form a suitable mixture without any interruption in the main air stream of the swirling flow in the cylinder.

Operations are made possible with the utilization rate of air inside the cylinder under full-load conditions enhanced up to the extremity and with the air-fuel ratio increased to excess throughout the entire space of the combustion chamber, in nearly smokeless state and without any disorder. There can be no possibility of the operation being restricted by the exhaust and smoke before the mixture inside the cylinder becomes excessively rich throughout. Thus, the engine of the invention is practically advantageous in that it is operated at excessively rich air-fuel ratios under full-load conditions as satisfactorily as conventional engines.

The present invention will now be more fully described hereunder in conjunction with some embodiments thereof, but it should not be construed that this invention is limited thereto; it should be obvious that means effective for the purification of exhaust emissions, improvement of the engine performance, and for simplification and extension of life of the component parts and members may be incorporated, wherever deemed appropriate, in the construction.

The accompanying drawings illustrate definite embodiments of the present invention, specifically as applied to a piston-valve type 2-cycle engine of Schnuerle scavenging system, an engine of simplest design. In the drawings:

FIG. 1 is a sectional side view of an internal combustion engine according to the present invention;

FIGS. 2 and 3 are enlarged views, partly in section, of the above engine;

FIGS. 4 and 5 are explanatory views principally illustrating the courses of movement of injected fuel particles of fine droplets;

FIGS. 6 and 7 show the trajectories of fuel droplets as developed along the inner wall surface of the cylinder head and as viewed from the piston side;

FIG. 8 is a view explanatory of the relationship between the cylinder head and the main air stream inside the cylinder; and In FIGS. 9 through 25 illustrating other embodiments of the present invention contemplated without departing from the spirit of the invention;

FIG. 9 is an explanatory side view showing another form of injected stream from an injection nozzle;

FIG. 10 is an explanatory plan view taken along the line I—I of FIG. 9;

FIG. 11 is an explanatory plan view of another form taken along the line I—I of FIG. 9;

FIG. 12 is a sectional side view of another form of mechanism including essential parts for the attainment of stratified charge;

FIG. 13 is an explanatory side view principally showing the courses of movement of the injected fuel droplets in FIG. 12;

FIG. 14 is a plan view explanatory of the trajectories of fuel particles in FIG. 12;

FIG. 15 is a sectional side view including another form of fuel injection nozzle;

FIG. 16 is an explanatory side view principally showing the courses of movement of injected fuel droplets;

FIG. 20 being a side view and FIG. 21 a plan view;

FIG. 24 being a side view and FIG. 25 a plan view.

Figure 17:
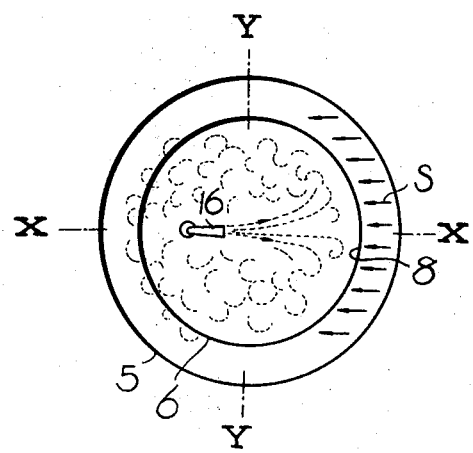
FIG. 17 is a plan view explanator of FIG. 16.

A significant feature of the present invention resides in the fact that the fuel injection may be made either against or into the direction of the main air stream in the cylinder of engine without any adverse effect so that the stratified charge carried by the main air stream is available well in time for ignition, and that, especially, the contour of the cylinder head, construction and location of the fuel injection nozzle, and other factors are combined altogether in optimized conditions in order to permit the injected fuel droplets to be spread and evaporated, except for the very beginning of injection, while approaching the inner wall surface of the cylinder head.

Another equally important feature is that a hollow recess or cavity is provided in the cylinder head so that the sprayed droplets of injected fuel in the cylinder of the engine are not directly exposed to the main air stream in the cylinder but are temporarily retained in the cavity so that they can be congregated to a misty mass consisting of a large amount of the fine particles and the mass can be subsequently carried away by the main air stream as a combustible mixture.

The construction and specifically the component parts will be more fully described below by reference to the accompanying drawings.

Referring to FIGS. 1 to 8, a reciprocating piston 1 is connected to a piston rod 13 in a crank case 12, and is accommodated in a cylinder 4, which is formed with an exhaust port 2 and a scavenging port 3 both adapted to be opened and closed by the motion of the piston 1. The head of the cylinder 4 has semispherical inner wall and is formed with a cavity 6 of a smaller radius and deeper than the semispherical contour. Through the inner wall surface of this cavity 6 there is provided an injection nozzle 7 for fuel supply to the cylinder 4. Fine droplets of fuel supplied from the injection nozzle 7 are directed to flow along the inner wall surface of the cavity 6, so that the fuel stream can be introduced against or in the direction of a swirling air stream S of fresh air supply in the cylinder 4, and that the resultant action can stratify the combustible mixture along the wall surface of the cylinder 4.

Cavity 6 formed in the cylinder head 5 is shaped to a semisphere, sector or other configuration effective for the charge stratification. The wall surface in the injective direction of the injection nozzle 7 provided in this part is so formed that a front edge portion 8 that constitutes a boundary between the head 5 and cavity 6 is connected to a vertical or inclined wall portion 9 and the opposite end of the wall portion 9 is smoothly curved and extended to a flat or curved top portion 10. As viewed from the top, the front edge portion 8 is formed to a cycle concentric with the cylinder 4. Cavity 6 is also fitted with a spark plug 11 about the center and the injection nozzle 7 alongside the plug at a suitable position and at a suitable angle thereto.

Injection nozzle 7 is provided with a nozzle orifice 7' on a side of the tip that is adapted to inject fuel to a swirling air stream S based on the scavenging of the cylinder 4, at a certain angle of spray divergence. Although the directed injection zone is beyond the spark plug 11 in the top portion 10 of the cavity 6, it is still along the inner wall surface in the neighborhood of the plug. (FIG. 2) This inner wall surface is suitably shaped so that an appropriate localized air stream can be produced within the cavity 6.

Contrariwise, in FIG. 3, the injection nozzle 7 is located upstream from the spark plug 11 with respect to the swirling stream S, and the stream of injected fuel from the injection nozzle 7 is directed downstream so as to ride on the scavenging stream. The nozzle location is such that, in the absence of the air stream, the injected fuel would reach a region near the upstream of the spark plug 11 (i.e., the region not beyond the spark plug 11). In any case, the components are arranged in such manner that the injected fuel can be finely atomized and sprayed at a certain angle of divergence with respect to the swirling stream S based on the scavenging stream.

In FIGS. 9 to 11, the injection nozzle 7 is shown as provided substantially in the center of the top portion 10 and is provided with a plurality of nozzle orifices 7' for the zones to which the fuel is directed. In the embodiment shown in FIG. 9, for example, one nozzle 7 is used to inject fuel in radial streams, which represent a combination of streams having components of force either normal or opposite to the swirling stream S. Even the streams of injected fuel which appear to run sidewise or at a right angle to the air stream as shown in FIG. 11 have a certain angle of divergence and may also be divided into two groups, one having opposite components of force and the other having reverse components of force. The center line of the jet streams is considered as an extremity or where the opposite or reverse component of force is reduced to zero. After all, therefore, it may be included in either an opposite or reverse stream. With incorporation of squish flows, these streams may be so provided as to create flow conditions and atmosphere all the more favorable for combustion.

Although not shown the injection nozzle 7 preferably has three or more nozzle orifices 7' to produce by itself a relatively uniformly dispersed mass of fuel droplets in the frontward region. When two such nozzle orifices are provided, they alone cannot of course provide a uniform mass in the opposing region, but the frontal wall surface of the cavity 6 is suitably shaped to baffle and disperse the mass of injected fuel droplets and thereby form a flow of droplets wherein any rarified, non-homogeneous portion is made up by these dispersed droplets. In this way a relatively uniform mass of fuel droplets is obtained throughout the region frontward of the cavity 6. In the directly injected region in the injective direction, each fuel stream is not excessively extended sidewise along the inner wall surface in the proximity but it moves in a strip form. Thus, considerations are given so that the streams can be scattered with sufficient spreading of a relatively homogeneous mixture along the cylinder head portion 5 and carried by the swirling stream S thereby to achieve steady charge stratification.

For the purpose of the invention, the cavity 6 is intended to serve as a recess where the spray particles of fuel fed therein are not directly exposed to the main stream of the air swirl S produced in the cylinder 4 but are temporarily retained and mixed in such manner that a large amount of the fine droplets can coexist. Also, the cylinder head 5 means the portion which surrounds the interior of the cylinder from about the top dead center of the piston 1 or, stated differently, the wall portion of cylinder head other than the portion along which the piston 1 slides inside the cylinder 4.

As the piston 1 in the cylinder 4 descends from an upper position near the cylinder head 5, the exhaust port 2 is opened first, thus permitting discharge of part of the exhaust, and then the scavenging port 3 is opened, when the fresh air being compressed in the crank case 12 is injected through the scavenging port 3 in the form of a scavenging air stream $S_1$ as indicated by a dotted curve with an arrow. In this way the residual waste gas in the cylinder 4 is scavenged and fresh air is supplied thereinto. When the piston 1 is near the bottom dead center as shown in FIG. 1, the exhaust port 2 and scavenging port 3 of the engine are both opened, and scavenging is accomplished with fresh air, and a strong scavenging air stream $S_1$ is created inside the cylinder. Subsequent rise of the piston 1 first closes the scavenging port 3 and then the exhaust port 2, but the air stream in the cylinder subsists as it is replaced by the swirling air stream S as shown in FIG. 2 by dint of the law of preservation of momentum, or by its inertia force, and is gradually damped off. The swirling air stream S has a rotational vector normal to the axis of the cylinder, and the compositional distribution of the air and the already burned waste gas of the previous stroke in this field of swirl is such that the waste gas proportion is large in the central zone and the fresh air proportion is high in the peripheral zone.

Into such a field of flow a compressed fuel is injected from the injection nozzle 7 in the form of finely atomized droplets at a suitable timing. The injection is aimed within the cavity 6 of the head 5 and at the wall portion 9 of the hollow provided that the air exerts small influence. Thus, any wasteful dispersion of the injected fuel droplets at a high speed into the non-combustible region is precluded and the scattering and mixing of the minute particles in the hollow is promoted to an optimum state. In other words, the mass of injected fuel droplets is thereby formed into a stream of deviated and dispersed fuel droplets, and a relatively homogeneous mass of fuel droplets is obtained, or a mass containing a mixture of air and vaporized fuel is produced, throughout the entire region ahead of the cavity 6.

The foregoing actions are fortified by the combined action of the air streams S and $S_1$, and thus the actions of dispersion, scattering, mixing and carrying are accomplished in succession for charge stratification. To be more exact, the flow of air streams S and $S_1$ gives an effect as if attained by a turbulence generator in the frontal edge portion 8 of the cavity 6. Localized turbulence produced in this region causes suitable mixing, dispersion and rarification of air with the mass of fuel particles containing the vapor thereof. The resulting mixture is richer towards the outer, peripheral region and leaner toward the inner, central region of the air swirl. Since the field of flow is of a swirl, a centrifugal force works and, because in this field of flow the fresh air proportion is increased and the mixture becomes richer and hence the apparent specific gravity is higher toward the outer region, the flow condition is extremely stable. Thus, the stabiliity as a whole of the flow maintained despite the localized mixing effect as by turbulence means that the extension of the stratum portion which is made too lean to burn is avoided or minimized, if any.

As described, while the overall air-fuel ratio attained is high as viewed from the standpoint of the combustion chamber as a whole, it is possible to prevent useless scattering of injected fuel droplets and to avoid expansion of the layer made too lean to burn, and thereby keep the emission of unburnt hydrocarbons in the exhaust to a minimum. Of the mass of injected fuel droplets, a part hits against and deposits on the wall surface. However, this is a secondary phenomenon. Most of the fine droplets are rapidly evaporated because the fine droplets are scattered extensively, the wall temperature is kept moderately high, and the temperature of air itself increases with the progress of compression. If the mass of fuel droplets is partly left until the closing stage of compression, its evaporation is promoted by the heat of firing and combustion and is gradually incorporated into the stratified charge to take part in the combustion, thus contributing to the complete combustion of the fuel.

Let us now discuss the case of a typical droplet of fuel injected through the nozzle orifice 7' of the injection nozzle 7 shown in FIG. 4. At a point P immediately after the injection, the vector of speed of movement $\overline{PP'}$ is remarkably greater than the vector of air velocity $\overline{PP''}$ and therefore the influence to which the course of movement of the droplet is limited, and the deviation from the line $\overline{QQ'}$ which is the original course in the absence of a swirl is negligible. Actually, however, the droplet is so minute that it can be very easily decelerated and, when it has arrived at the point R, its speed vector $\overline{RR'}$ has already been reduced to a low level. On the other hand, the value of the vector of swirling air velocity $\overline{RR''}$ remains little different and is considered to be almost equal to $\overline{PP''}$ and therefore the influence which the course of movement of the particle obtains is large and the amount of deviation is also increased. Consequently, the curved trajectory QQ'' is followed.

Even if the fuel droplets are injected in the same direction at a same speed, their trajectories vary with size. As shown in FIG. 5, for example, a large droplet flies along the line $QQ_1$ with relatively little curvature. The smaller the particle size the greater the curvature, as exemplified by the curves $QQ_2$ and $QQ_3$. Even smaller droplets tend to ride on the swirl S and be carried away as along the curves $QQ_4$ and $QQ_5$ before they reach the wall surface. The mass of fuel droplets injected from the nozzle 7 takes a certain curve of probability distribution although the fuel is finely atomized, and therefore a part of the fuel consisting of relatively coarse droplets is scattered over an extensive area of the wall surface and is deposited thereon, while the rest that constitutes the majority of the fuel approaches the inner wall surface of the head 5 but turns the direction and moves together with the swirl S.

In the foregoing, it is possible to modify the trajectories of fuel droplets suitably to the position and height of the nozzle 7 and the contour of the inner wall surface of the head 5, and also to change the distribution of the trajectories as well as the concentration and distribution in the mixture of the vapor obtained from the wall surface.

In general, as illustrated in FIG. 6, fuel in the form of droplets is injected through the nozzle orifice 7' with a divergence of a certain spray angle, but is subjected to the action of the opposing swirl S. Considering two typical droplets M and N, they are assumed to have the vectors of speeds $\overline{MM'}$ and $\overline{NN'}$. Hence the two droplets tend to move away from each other, that is, the tendency is apparently toward a greater spray angle. As has been explained, this depends on the size of droplet regardless of the injection speed. Consequently, as in FIG. 7, the tendency is aided by the localized attendant air streams due to the fuel injection and, after all, the fuel droplets which should be otherwise directly injected into the zone E but for the opposing air stream S is scattered in the face of the counter-current of air into the region extended to the zone F. The fuel droplets while approaching the wall are shifted in the direction of swirl stream S. Moreover, because the air temperature rises with the progress of compression and because the fuel droplets are maintained at a relatively high velocity as compared with the flow velocity of the air swirl as already described, evaporation from the surface of fuel droplets is accelerated.

If the temperature of the head 5 is kept adequately high, the fuel scattered and deposited over the large area is rapidly evaporated and mixed in the turbulent air stream that swirls. It thus contributes to the formation of swirling stream together with the fine droplets which do not deposit on the cylinder wall surface and evaporate themselves, thereby to attain stratified charge. Following the fuel injection and the extensive scattering, dispersion and mixing of the sufficient amount of the fuel, and after the fair progress of evaporation, the mixture is ignited and fired by the spark plug 11 located in the fuel laden region or downstream therefrom. In the vicinity of the spark plug 11 the spray stream contains many fuel droplets and has such a high fuel droplet density that firing is possible even though the mixture has only a limited vaporized content.

Thus, except for the very early stage of fuel injection, the fuel is spread while moving toward the inner wall surface of the cylinder head 5 irrespective of the mixing action due to turbulence and further moves through the medium of the swirling air stream. This combines with the presence of fuel droplets in the field of centrifugal force based on the swirl to permit the approach of the fuel droplets having greater specific gravity than air to the surface of the head 5 and, at the same time, in corporation of those droplets into the mixture of vaporized fuel greater in specific gravity than air, so that a steady state of charge stratification can be attained.

The intensity of this stratification can be modified by changing the location of the nozzle 7, the contour of the inner wall surface of the head, etc. It has been experimentally confirmed that when the configuration of the cylinder head 5 is such that, as shown in FIGS. 1 through 5 and in FIG. 8, the frontal edge portion 8 is angular to the swirl S and the boundary layer downstream therefrom is thick or a localized contraflow region G is produced or a turbulence is formed out of the region, the mixture containing the atomized fuel droplets is spread to or beyond the angular part into the entire region of the head 5, thus going through a desirable combustion process.

Accordingly, when the fuel is injected in the direction against the swirling air stream in the cylinder, the burning flame spreads throughout the entire region inside the head 5. This means that heat load is heavy for the inner surface of the head but light for the surface of the piston 1 and it grants much advantage from the standpoints of cooling and lubrication. It is beneficial, moreover, for the purification of exhaust emissions. Even if hydrocarbons, HC, and carbon monoxide, CO, left unburned during the stroke of combustion and expansion remain on the inner wall surface of the head, the incoming scavenging air acts like the air injected into the exhaust valve chamber of a conventional 4-cycle engine. That is to say, the reaction of unburned remnants is promoted by the fresh air supply and it not only contributes to the production of cleaner exhaust but exerts a large combustion burden on the inner wall surface for the head, which is very effective and convenient for the promotion of the foregoing actions.

When, on the other hand, the stream of injected fuel from the nozzle 7 runs in the direction of the swirl S and merges therein as shown in FIG. 3, relatively coarse fuel droplets are little affected by the air stream by reason of the injection angle and are scattered and deposited on the inner wall surface up to the spark plug 11 and are eventually evaporated, whereas relatively fine droplets approach the inner wall surface of the head 5 but, short of contact therewith, they move together with the swirling air stream S and, in the same way as in the case with the counter air stream, the mixture containing the fuel particles is stratified. In this case, though, the swirl is rather intensified by the air stream attendant on the fuel injection, with the result that the mixture containing the fuel droplets is restricted from spreading sidewise and moves in the form of a strip.

In the foregoing, the fuel injection from the nozzle is described, by way of illustration, as being effected after the scavenging has been completed and the air intake and exhaust ports and valves have been closed and the air stream inside the cylinder has become a swirling stream therein. In actuality, however, fuel may be injected into the air stream which takes the form of a scavenging air stream or a swirling air stream based thereon that flows while the exhaust port or both the exhaust port and intake ports are kept open unless the atomized fuel particles or the resulting mixture flows out through the exhaust port. This is rather advantageous at increased loads because the dispersion, mixing and evaporation of the fuel are thoroughly accomplished.

In FIGS. 12 to 14, there is shown an embodiment wherein the atomized droplets from the nozzle orifice 7' of the fuel injection nozzle 7 are not directed along the top portion 10 of the cavity 6 but are supplied to the cavity 6, in particular close to the swirl S inside the cylinder. At the point P which is relatively near the nozzle orifice 7', the existing velocity of each droplet is high, and the vector of resistance to which the droplet is subjected as it flies through quiescent air is $\overline{PP'}$ and the vector of resistance when the droplet remains still and only the swirl S exists is $\overline{PQ}$, and the direction is equal to the direction of the swirl at that point. If the vector $\overline{PQ}$ is divided into two components of force, one in the direction of $\overline{P'P}$ and the other in the direction normal thereto, then we obtain $\overline{PQ'}$ and $\overline{PQ''}$. Since the existing velocity of the droplet at the point P is much greater than the swirling air velocity, $\overline{P'P}$ is considerably higher than $\overline{PQ'}$. Accordingly, the vector $\overline{P'Q'}$ is the resistance force to which the droplet is subjected counter to the flying direction, but because it is much greater than $\overline{PQ''}$ which represents the force to cause the deflection of the trajectory to the direction normal to the $\overline{P'Q'}$, the droplet is deviated from the original trajectory which is maintained while in the absence of the air swirl but the deviation is small.

The velocity of each fuel droplet which is initially high, will rapidly drop due to the small mass of the minute droplet itself. For example, the resistance force to which the droplet is subjected in the flying direction with the existing velocity at the point R is as small as $\overline{RR'}$. On the other hand, the velocity of the swirl S undergoes no material change, and the vector of resistance thereby attained is $\overline{RR''}$. Since the trajectory of the droplet is fairly curved up to the point A, $\overline{R'R}$ and $\overline{RR''}$ at that point are nearly normal to each other. Thus, the deflection of the particle is considerable and the radius of curvature of the trajectory is small. With the further advance, the vector of advance and the vector of swirl are directed in the same way. As a result, the droplet is subjected to a little drag and the radius of curvature of its trajector is made larger so that the droplet can be moved on the swirl. A secondarily induced, localized stream of air accompanying the injection of fuel as a mass of fine atomized droplets also serves to promote the spreading of the fuel droplets and the production of turbulence. Moreover, it acts to decrease the swirl velocity in order to slow down the movement of the swirl itself generally at about the time when the spreading of the droplets is completed.

In this case, the fine droplets injected from the nozzle 7 is subjected to a velocity much different from that of the air stream. With the gradual progress of the compression stroke, the air temperature is increased and the combined action effects rapid evaporation of the droplets and preparation of the mixture of fuel with air, just in the same way as above described. This mixture forms a density pattern such that the density is relatively uniform along the inner wall surface of the cylinder head and becomes leaner away from the cylinder head surface. Stratification of the mixed charge is thus effectively achieved.

Spark plug 11 is in a well ignitable position because it is located downstream from the center line of injection, even when the engine is idling with a very meager supply of injected fuel. In addition, such a combination is greatly insensitive to firing and combustion relative to the ignition timing. In other words, there is provided an ample allowance for fairly free selection of a lead angle for ignition with respect to a predetermined injection timing and independently thereof. Further, by the provision of the frontal edge portion 8 which serves as an angular part for the scavenging air stream $S_1$, the mixture containing the atomized droplets is spread throughout the region downstream from the angular part or, beyond that, into the space in the cavity 6 of the head 5 even when the downstream boundary layer is thick or when a partial contraflow region G or a turbulence therefrom exists, thus lending themselves for a very good combustion process.

FIGS. 15 through 17 illustrate useful embodiment where a gaseous fuel such as propane is employed as the fuel to be directly injected into the engine. In this embodiment the tip of a fuel injection valve 17 is curved, extended and is provided with a nozzle tube 16 flattened and extended sidewise at the front end, so that a gaseous fuel can be injected into the space 6 in the cylinder head 5, with a certain angle of divergence for effecting mixing of the injected stream V against the direction of and with the swirl S based on the scavenging air in the cylinder 4. The fuel injection valve 17 is of solenoid type adapted to supply regulated pressure gas, and permits injection of the fuel gas into the combustion chamber as the valve is kept open, with a controlled opening over a calculated crank angle after the closure of the exhaust port 2, by the r.p.m. of the engine and the position of the operating lever (not shown). The nozzle tube 16 is formed with an outlet port 15, through which the gaseous fuel is injected at a high speed and with a certain angle of divergence. In the stream portion near the outlet port 15 the air proportion of the mixture is so small and the injection velocity is so high that it receives only little influences from the swirl S in the cylinder, and there are few changes of the passage being curved. As the injected gas advances, it is increasingly mixed with the surrounding air and gains a growing width with gradual reduction of the velocity. Aided by the contours of the cylinder head 5 and the cavity 6, the velocity of the gas is considerably decreased as it approaches the inner wall surface. In addition, under the strong influence of the swirl S in the cylinder 4, the gas stream is urged downstream (as in FIG. 16) and is spread along the inner wall surface (as in FIG. 17), and while being mixed with the swirling air stream, it is circulated generally as if riding on the swirl S. Especially because the frontal edge portion 8 which somewhat protrudes against the swirl S is provided on the head portion 5, a thick boundary layer or contraflow region is formed downstream therefrom, or a turbulence due to separation from the stream is produced, with the result that the mixture is rendered relatively homogeneous and will spread throughout the space in the cavity 6 of the cylinder head.

The fuel injection serves to spread the mixture and, at the same time, to accelerate the turbulence and decelerate the swirl. A strong turbulence component which the swirl itself contains is useful in mixing the fuel and is desirable for the increase of combustion velocity. About the time when the spreading of the mixture is completed the mean velocity of circulation of the swirl tends to decrease as a whole.

When the injection timing is advanced and the injection is effected over an extended period as above described, the fuel gas already injected is mixed with the swirling air and the injection is forced in succession from the inside of the head to the top portion of the piston 1 in the cylinder 4 until the cylinder is filled with the mixture.

On the other hand, if the injection timing is retarded and the injection is limited to a short period of time, a stratified charge results inside the head. When the mixture is ignited with a spark by the spark plug 11 with a suitable timing after the injection, combustion is initiated. As the gaseous fuel injected through the outlet port 15 forms the mixture inside the head in the manner described, the fuel concentration in the mixture is high inside the head 5 above the line X—X in FIG. 17. Away from this axis, or toward the direction of the line Y—Y, the concentration gradually drops and hence the air-fuel ratio becomes leaner. Only if the mixing ratio inside the cylinder head along the axis X—X is adjusted to a slightly excessive richness which is most desirable for firing and combustion, it becomes possible to use the powerful energy of combustion flame produced by the ignition for the ready reaction of the surrounding relatively lean mixture. Good combustion is thus obtained at a very lean overall air-fuel ratio.

Since the system is applicable to the engine which may dispense with the throttle, the amount of air supply required is little different at part loads. This combines with the meagerness of the fuel injected which takes part in the combustion to maintain the temperature of the nozzle tube 16 at a low level. Accordingly, in this state, the temperature rise of the gas fuel in the course of injection is limited, and partly because LPG gas or the like originally has a greater specific gravity than air at the same temperature, the resultant centrifugal action of the field of swirl tends to facilitate the stratificaion of the charge. This renders it possible to use even leaner air-fuel ratios.

The intensity of stratification may be controlled by modifying the configurations, locations and directions of the nozzle tube 16 and its opening or outlet port 15, and the inner contour of the head 5. The fuel gas injected in this way is thoroughly mixed, spread and stratified. Moreover, because the gaseous fuel is directly injected into the cylinder, the intake volume efficiency of the engine is not sacrificed as by the conventional system of supplying the fuel into the intake port of the engine. For these reasons, there is no possibility of reduced power output as in the engine running on liquid fuel. Further, the residence time of the fuel in the form of unburned mixture in the cylinder is shortened and the anti-knock advantage is coupled with the improved mechanical octane number due to the nature of the fuel and also with the increased compression ratio to realize improvements in thermal efficiency and power output.

In FIGS. 18 to 21 there is shown another useful contour of the cavity 6 formed in the cylinder head 5 of the embodiment above described. Here the cavity 6 is shaped substantially to a sectoral contour, and the opposite wall surface in the injective direction of an injection nozzle 7 provided in the cavity is comprised of a frontal edge portion 8 which serves as a boundary between the head 5 and the cavity 6, and a wall portion 9 adjacent and perpendicular thereto, the vertical wall portion 9 being extended at the other end through a curved portion 13 to a flat or curved top portion 10. The cavity 6 thus provided has the inner wall surface so formed that the cavity is shallow in the vicinity of the frontal edge portion 8 and is progressively deepened toward the injection nozzle 7. In addition, the inner wall surface of the cylinder head 5 is preferably curved to a semispherical contour generally matching that of the top portion of the piston.

Figure 18:
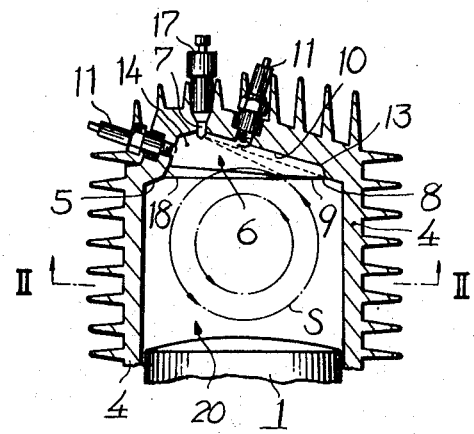
FIG. 18 is a sectional side view of another form of the cylinder head including essential parts for the formation of stratified charge.

As shown in FIG. 18, an injection valve 17 having an injection nozzle 7 so directed as to inject the fuel either at some angle with respect to or parallel to the top portion 10 of the inclined plane of the inner wall surface of the head 5 is provided near the deep portion 14 of the cavity 6. The injection nozzle 7 is formed with a single or a plurality of orifices and is adapted to inject the fuel at a certain angle of divergence for dispersion of the fuel particles as can be seen from FIG. 19. Even with a single-orifice nozzle of simple design, the fuel dispersion is of course satisfactorily accomplished by the combined action with the opposing air stream and with the aid of the head configuration.

Figure 20:
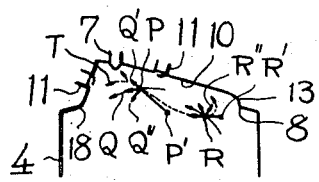
FIGS. 20 and 21 are views generally explanatory of the courses of movement of fuel droplets in FIG. 18.
Figure 19:
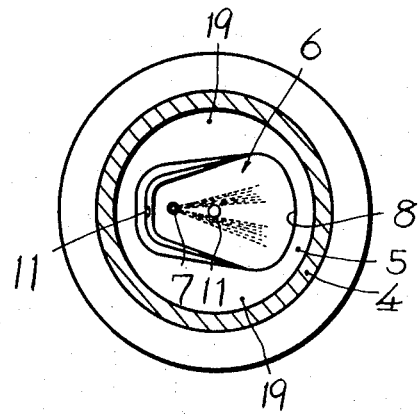
FIG. 19 is a sectional view taken along the line II—II of FIG. 18.
Figure 21:
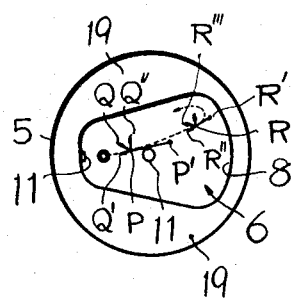
Figure 22:
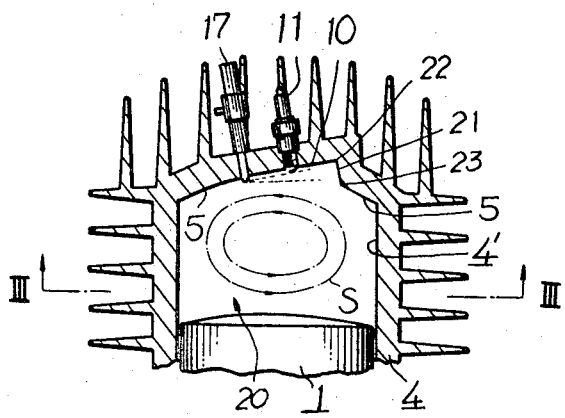
FIG. 22 is a sectional view, partly in section, of still another form of mechanism including essential parts for the formation of stratified charge.
Figure 24:
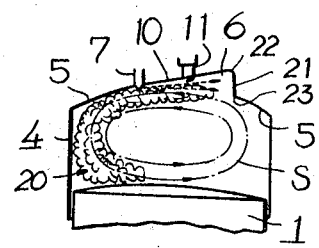
FIGS. 24 and 25 are views explanatory essentially of the courses of movement of fuel droplets shown in FIG. 22.
Figure 23:
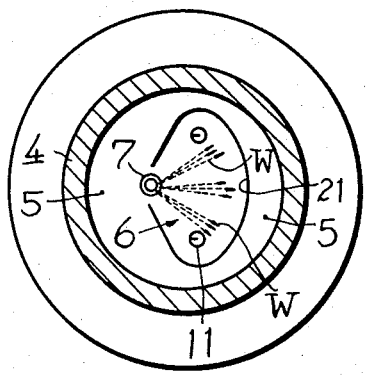
FIG. 23 is a sectional view taken along the line III—III of FIG. 22.

In the embodiment shown, two spark plugs 11 are fitted in the cavity 6 of the cylinder head 5. One is provided downstream from the nozzle 7 as viewed from the flow direction of the scavenging air stream, and the other is suitably located on the inclined plane surface of the cavity 6. The internal contour of the cavity 6 is such that, as shown in FIGS. 18 and 19, it consists of a sectoral, inclined and plane top wall portion 10 and a diagonal cutaway portion 18 both defining a space wherein the mass of injected fuel spray is spread by the scavenging air stream or a swirling stream thereof, and a relatively quiescent recess and the surrounding wall portion wherein the fuel is not subjected to the influence of high air velocity of the main scavenging stream or the main swirling stream thereof. The frontal edge portion 8 is preferably arc-shaped concentrically with the cylinder 4 as better shown in the plan views of FIGS. 19 and 21. Also, the wall portion 9 may be formed to an inclined plane instead of the vertical plane. In any case, the mass of injected particles is deflected and dispersed to form a stream of particles which will fill up the region in front of the cavity 6 thereby to form a relatively homogeneous mass of fuel particles throughout the front or rear region of the cavity 6. Moreover, the particles are retained temporarily to give a high particle density so that steady charge stratification can be attained. The trajectory of each fuel particle injected from the nozzle 7 exposed inside the cylinder head is as represented by a dotted line in FIG. 20. While it has a certain broad angle, the particle velocity is such that the vector of resistance to which the particle is subjected as it flies through quiescent air is $\overline{P'P}$. If the particle rests still at the point P and if there is a swirl E, the vector of resistance thereby produced in $\overline{PQ}$ and the direction is equal to the direction of the air stream at that point. If the vector $\overline{PQ}$ is divided into two components of force, one in the direction of $\overline{P'P}$ and the other in the direction normal thereto, then $\overline{PQ'}$ and $\overline{PQ''}$ are obtained, respectively. Because the existing velocity of the particle at the point P is generally much higher than the velocity of the air stream, $\overline{P'P}$ is greater than $\overline{PQ'}$. Accordingly, the vector $\overline{P'Q'}$ is almost equal to the resistance force to which the particle is subjected opposite to the flying direction, and is fairly greater than the vector PQ'' which deflects the trajectory normal thereto, as in the case already explained. For example, the existing velocity upon arrival at the point R is considerably low, and the vector $\overline{R'R}$ to which the particle is subjected in its flying direction is small. In the meantime, the velocity of the air stream S undergoes practically no change and, therefore, the advancing particle is rather exposed to the main air stream and is strongly influenced thereby. Consequently, the particle forms a trajectory, as it advances, such that it is increasingly strongly deflected by the air stream S and the radius of curvature is decreased until the particle is carried away on the air stream. That is to say, as illustrated in FIG. 20, fuel particles make a composite motion with a tendency to be extensively spread along the top portion 10 while moving as approaching the top portion 10 of the inclined plane and are carried away on the air stream S with the loss of most of the kinetic energy in the direction toward which they have been injected from the nozzle 7. Because this air stream swirls in the neighborhood of the head 5 and the particles are in the field of centrifugal force, a force is exerted whereby the particles are drawn near the inner wall surface of the head but are extensively spread along the inner wall surface of the head 5 while being suitably mixed up by the air stream which is a fairly vigorous turbulence per se. In this way charge stratification is realized whereby a mixture is formed that is richer toward the inner wall surface of the head 5. Although it depends on the injective direction from the nozzle 7, only a small part of the atomized particles is spread, scattered and deposited on the inclined plane surface 10 and other portions. It is also evaporated by heating with the heat from the wall surface and from the combustion flame, and thereby forms a mixture. However, this is only a part of secondary phenomenon in the formation of combustile mixture. Most of the fuel in the form of fine injected fuel particles from the nozzle 7 is exposed to the relatively high velocity of the air stream and, with the gradual progress of the compression stroke, the air temperature also rises and the mixture is stratified with accelerated evaporation, until eventually a mixture of atomized fuel or a cloud containing the evaporated fuel is circulatingly moved as part or whole of the swirling air stream S.

Inasmuch as the interior contour of the head 5 is converged, as shown in FIG. 19, toward the spark plug 11, and because of the action of the centrifugal field of the swirl, the mixture is collected in the proximity of the spark plug 11 as a relatively rich cloud. In the hollow of the recess 6 where the spark plug 11 is located, there is maintained a relatively slow air stream condition. As it is a recess like a pocket that provides a shelter against the rapid air stream, it is desirable for the growth of flame seed by ignition with an electric spark. Thus, it not only serves as a powerful source for firing the surrounding mixture but is effective for the prevention of misfiring, fluctuation of pressure inside the cylinder by cycle and maximum pressure fluctuation.

Fuel particles injected from the nozzle 7 include those of low velocities or of extremely minute sizes. These contents tend to be readily carried away by the swirl S. For example, as indicated by the dotted line T in FIG. 20, they can be allowed to take part in the combustion instead of being retained or deposited and evaporated in the vicinity of the spark plug 11 and without being wastefully scattered out of the stratified charge. The advantages derivable therefrom include an improved efficiency and reductions in unburned hydrocarbons in the exhaust.

Even when the amount of fuel injection per cycle of full-load operation cycle is large, the combined action with the air stream S or $S_1$ permits the fuel particles to be so thoroughly dispersed that there is no danger of misfire due to excessive fuel concentration around the spark plug 11, though it should be noted that better result is obtained by replacing the procedure of injecting a large amount of fuel within a short crank angle by the injection of the same amount of fuel within a crank angle of a certain length. In such heavy-load operations, it cannot be overlooked that the combined use of two spark plugs 11 for simultaneous ignition gives satisfactory result. While the two spark plugs in this embodiment are located on the center line of the scavenging air stream, experiment has proven they can display performance as satisfactory as above when they are fitted in the top portion 10 or side wall portion of the cavity 6 symmetrically with respect to the center line. It must be taken into account, though, that the above factor is closely related to the configuration of the cylinder head 5.

Further, with this embodiment, the squish flow formed by the planar side portions 19, 19 of the inner wall surface of the cylinder head 5 and the corresponding top portion of the piston 1 produces a pair of vortices within the combustion chamber 20 during the course of the compression stroke, particularly toward the end of the stroke, and the vortices and the turbulence thereby produced are superposed with the movement of the particles.

The combined movements serve to promote the dispersion of fuel particles along the top portion 10 of the inclined plane and in the vicinity of the deepest portion 14 of the cavity, avoid excessive concentration of the mixture near the center line including the spark plugs 11 and the nozzle 7, and urge the stratified charge against the inner wall surface of the head 5.

It is alternatively possible to intensify the squish by forming the flat side planes 19, 19 of the head very close to the top plane around the top dead center of the piston 1, or in such manner as to decrease the clearance of the top dead center, and conversely to weaken the squish, for example, by gradually increasing the above clearance toward the center of the head, so that the stratified charge may be rather collected toward the direction of the center line. After firing, the combustion gas becomes lightweight and moves toward the center of the swirl, where it is replaced by fresh air that forms a mixture with the fuel thereby to take part in the combustion. By means of the squish formed by the inner wall surface of the cylinder head and the top portion of the piston, the mixture containing the fuel particles is suitably dispersed or concentrated and then is superposed with the swirl S inside the cylinder. This facilitates firing subsequent combustion.

In FIGS. 22 through 25 there is shown another embodiment which, like the embodiment just described, has a head 5 of substantially semispherical inner contour, and is fitted with an injection valve 17 at a suitable position, which valve is so located that the nozzle 7 at its tip (illustrated as a hole nozzle with a suitably chosen number of holes and relative injection angles) has an injective direction against the direction of the scavenging air stream S. The semispherical inner wall of the head is formed with a sectoral cavity 6, and the tip of the nozzle 7 protrudes at a point which represents the pivotal point of the sector. The cavity 6 is shallowest in this region and the cavity depth increases toward the surrounding sectoral wall. The top portion 10 which constitutes the sector is flat, while the surrounding wall 21 is cylindrically shaped, in parallel relation with the cylindrical wall surface 4' of the cylinder.

In this embodiment the direction W of injection from the nozzle 7 is substantially at right angles to the axis of the injection valve 17 and is directed to the surrounding wall portion 21 of the cavity. The corner where the surrounding wall portion 21 of the cavity 6 contacts with the sectoral portion 10 is formed as a suitably-rounded surrounding corner 22, and the other end of the surrounding wall portion 21 is shaped to be a sharp edge portion 23.

The opening angle of this sector varies depending on the number of holes of the nozzle, the injection angle of divergence, fitting position of the injection valve, etc., but generally it is decided upon so that a stratified charge can be formed which has a suitable expanse and is carried by the swirl in the cylinder. In the embodiment shown, two spark plugs 11 are fitted to the top portion 10 of the sectoral plane near both side edges of the sectoral cavity 6, in chosen positions where they are not directly exposed to the main stream of the scavenging air S or expressed main stream of swirl based thereon in the cylinder but protrude in a relatively quiet atmosphere and in a suitably rich mixture.

In this case, the fine droplets of fuel injected from the nozzle 7 are initially exposed to the air stream S, and the spray is decelerated and spread. A part of the sprayed fuel loses the momentum and moves together with the air stream S, but the rest mostly goes on advancing without complete loss of the momentum. As the latter advances, the sectoral cavity becomes deeper so that the fuel is little affected by the direct action of the air stream S until it hits against the surrounding wall portion 21 of the cavity, where it loses the momentum in the advancing direction. Thereupon a part of the atomized fuel is scattered away along the wall surface, while the mass of the atomized fuel droplets fill up and partly flow out of the cavity 6, particularly along the surrounding wall portion 21. On the other hand, the air stream S is interrupted by the edge portion 23 where the borderline is discontinuous, and gives a localized turbulence, which in turn attracts and mixes the mass of atomized fuel droplets. Here a band of mixture having a span substantially equal to that of the cavity 6 is formed, and it circulates together with the air stream S in the cylinder 4 (see FIG. 24). Although a part of the mass of injected droplets hits against and deposits on the wall surface, it is immediately vaporized because the wall is kept at a suitably high temperature, and joins the mass of atomized droplets for subsequent incorporation into the band of mixture. Also, by the heat of combustion after firing, the evaporation of the rest of the fuel is encouraged and the resulting vapor takes part in the combustion. Furthermore, because there is no possibility of the injected fuel spattering and depositing directly on the inner wall surface of the cylinder, lubrication trouble is precluded notwithstanding the direct injection into the cylinder.

Although the temperature of the edge portion 23 which protrudes into the combustion chamber 20 rises upon exposure to the combustion flame, the heat is carried away by the subjection to the vigorous stream of cold scavenging air and by the evaporation of the fuel. Accordingly, the edge portion 23 is suitably cooled and provides no hot point. The stratified clouds of mixture thus produced flow circulatingly together with the air stream S, but because the streams are swirling, they are in a field of centrifugal force and are subjected to a suitable degree of mixing action and are broadly spread along the inner wall surface of the head 5, thus producing a stratified charge with increased richness toward the peripheral region. Since the stratification is accomplished in such a way that the mixture is richer toward the outer side and the specific gravity per unit volume is also greater toward the periphery, the demand and supply of air required for the fuel supply are naturally balanced, and the process of their movements is stabilized. Where a properly stratified charge is formed in this manner, it is simultaneously ignited by the spark plugs 11 in the cavity 6 (i.e., by the spark plugs 11 in the atmosphere where there is the relatively rich mixture, off the passage of the vigorous air stream). By the growth of the initial flame front, it provides a powerful heat source for firing the leaner mixture therearound. The fuel supply being achieved through the nozzle 7 with a high pressure and the ignition being made primarily of the mixture containing the finely atomized fuel droplets, no difficulty is presented in the cold start and the engine can be immediately switched over to the full-load operation. The pressure rise rate in the cylinder is relatively low and the operation is smooth.

The embodiment just described involves no squish flow action and hence no quenching on the squish face. In addition, because the combustion chamber 20 is generally of an ideal semispherical contour, performance improvement and reductions of unburned hydrocarbons in the exhaust can be realized effectively and positively.

Figure 25:
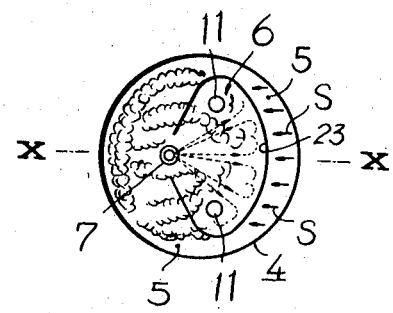

It is to be noted that, while the Schnuerle scavenging system is adopted in this embodiment, the air stream through the space inside the head 5 will not always flow exactly along the center line X—X of FIG. 25 because of minor difference between the left and right air passages as viewed from the crank case 12, and it is rather normal that the stream flows with a certain angle of deviation. Even in such case, the cavity 6 functions well by virtue of the surrounding wall portion 23 which extends extensively and arcuately. Thus, the embodiment is insensitive to the deviated flow and the degree of adversely affecting the production of mixture is only slight or, stated differently, the specific performance difference among engines is negligible at an advantage.

While the present invention has been described in conjunction with various embodiments thereof as incorporated in 2-cycle, electric ignition engines of Schnuerle scavenging system, it is equally applicable to the engines of loop or cross scavenging system. Also, the ignition system is not limited to electric spark ignition, and the adoption of other usual ignition means such as glow plug, hot bulb or such other ignition system as diesel system which does not depend on ignition from the outside, is not objectionable.

Since the engine according to the present invention operates as described hereinabove, steady combustion is obtained by varying the intake ratio over an extensive range without any hindrance to combustion because the swirling air stream contains much fresh air in the outer region, for example, even when the air supply is throttled to a lower intake ratio. This is a most beneficial factor for the engine using a scavenging system of crank case compression type. The pumping loss work of an engine wherein loop or cross scavening is resorted to in the 2-cycle fashion increases with the increase of the intake ratio, and the relation that holds between the intake throttle and the pumping loss work is contrary to that established in a 4-cycle engine. It is therefore desirable that the intake throttle is intensified with the lessening of load. On the other hand, the charge stratification is directed to the realization of improved thermal efficiency and purified exhaust through the improvement of specific heat ratio of active gas, reduction of heat loss to the surroundings, rise of heat development rate due to the reduction of heat dissociation, etc., by achieving stabilized combustion with lean overall mixtures. In these senses it is desirable that the air-fuel ratio be as lean as possible within the range which warrants steady combustion and precludes supercooling, and it is of practical value to use an optimum air-fuel ratio (e.g., between 16:1 and 20:1) according to the load and number of revolutions.

Also, as described in conjunction with the foregoing embodiments, even the fuel injected directly into the cylinder will not hit against and deposit on the sliding wall surface of the piston, and therefore troubles that otherwise may arise in relation to lubrication can be effectively prevented at a rational advantage. In addition, because the ignition is effected for the misty mixture containing the fuel injected in the form of finely atomized droplets and also the partly vaporized fuel, the fuel droplet distribution is high and provides no hindrance to the cold start. Further, the stratified charge is formed positively to an optimum state as already described, and there is no need of the very cumbersome control based on the matching of three factors, i.e., fuel injection, ignition and air swirl, which is often essential for the conventional process of combustion. In other words, there is ample allowance between fuel injection and ignition and both can be modified and set over extensive ranges independently of each other, in accordance with the present invention. This ample allowance in turn provides conconsiderable flexibility against deterioration of the fuel spray. The deterioration, if any, can have no appreciable effect upon the engine characteristics (this fact having been confirmed experimentally).

The degree of charge stratification in the field of swirl can also be fairly varied by suitably modifying the contour and dimensions of the cavity 6 and the method of fuel injection from the injection nozzle 7. It is also possible to advance the crank angle for initiation of injection and widen the crank angle for effective injection with the increase of the load thereby to form a non-interrupted, adequate misty mixture within the swirling stream in the cylinder at heavy loads. This means that the utilization rate of air inside the cylinder under heavy loads can be greatly enhanced. It enables the engine to be operated without any trouble in a practically smokeless state even if the mixture is excessively rich when viewed as a whole. There is no danger of the engine operation being restricted by the exhaust smoke before the mixture becomes excessively rich throughout the cylinder, as is often the case with certain types of stratified charge engines. Thus, full-load operations with excessively rich mixtures are rendered possible as by conventional carbureted engines. Still more, no additional attachment or the like is required for the drastic and simultaneous reductions of the three noxious components of the exhaust emissions, i.e., carbon monoxvide, CO, hydrocarbons, HC, and nitrogen oxides, NOx, which are notorious sources of public hazard, and thus the present invention contributes greatly to the overall purification of exhaust gases from internal combustion engines.

What we claim is:

1. In an internal combustion engine incorporating a loop or cross scavenging system having a cylinder formed with a head and a side wall, a piston reciprocating in said cylinder, an exhaust port and a scavenging port, said ports adapted to be opened and closed by the movement of said piston, the improvement which comprises said cylinder head and side walls and said piston defining a single combustion chamber, said cylinder head being formed with a recess centered on the longitudinal axis of said cylinder, said recess having a periphery space inwardly from said cylinder side wall and shaped to avoid auxiliary combustion therein, said recess being of a depth smaller than the largest diameter of said recess periphery, said recess periphery defining the largest cross-section of said recess, said engine including injection nozzle means for the supply of fuel into said cylinder, said nozzle means directing said fuel toward the inner wall surface of said recess for the temporary retention of the injected fuel in said recess, whence said fuel is driven or carried away on the loop scavenging air stream and/or swirling stream within said combustion chamber, so that the fuel mixture has a composition density thin in the central region of said swirling stream within said combustion chamber and thick toward the periphery thereof, said peripheral thick layer including a layer on the inner surface of said cylinder head; said engine further including ignition means for effecting ignition in said recess.

2. An internal combustion engine according to claim 1, wherein said cylinder head except for said recess is formed in a configuration corresponding to that of the opposed face of said piston, said recess having a substantially spherical curvature adapted to temporarily retain therein the supplied fuel without directly exposing said fuel to the main air stream in said cylinder.

3. An internal combustion engine according to claim 1, wherein said recess is shaped substantially in the form of a fan having an apex region in which said injection nozzle means is positioned and a broadened region toward which said fuel is directed by said nozzle means for the dispersal of said fuel in said recess, said recess also having an inner wall face in aid broadened region configured to create a convoluted flow of fuel.

4. An internal combustion engine according to claim 1, wherein the junction between at least the portion of the peripheral edge of the inner wall of said recess toward which said injection nozzle means directs said fuel and the adjacent surface of said cylinder head defines an angle for the generation of a squish flow in said combustion chamber upon the approach of the top face of said piston, the surface of said cylinder head except for said recess being formed in a configuration corresponding to that of said top face of said piston.

5. An internal combustion engine according to claim 1, wherein the inner wall of said recess extends from said peripheral edge portion in a gentle curve to the top surface of said recess.

6. An internal combustion engine according to claim 4, wherein said recess is shaped substantially in the form of a fan having an apex region in which said injection nozzle means is positioned and a broadened region toward which said fuel is directed by said nozzle means, said recess being shaped to be shallowest in the vicinity of said injection nozzle means and to be gradually deepened in said broadened region.

7. An internal combustion engine according to claim 4, wherein said recess is shaped substantially in the form of a fan having an apex region in which said injection nozzle means is positioned and a broadened region toward which said fuel is directed by said nozzle means, said recess being shaped to be shallowest in the vicinity of said broadened region and to be gradually deepened as it extends from said broadened region toward said apex region.

8. An internal combustion engine as recited in claim 1, wherein said recess faces the top face of said piston and is formed with a substantially curved cross section, said recess being formed with a peripheral protruding edge for producing localized turbulence upstream or downstream of the scavenging air stream and/or swirling air stream within said cylinder, said peripheral edge extending substantially parallel to said cylinder side wall.

References Cited
UNITED STATES PATENTS

| | | | |
|---|---|---|---|
| 2,457,652 | 12/1948 | Fisher | 123—32 |
| 2,695,600 | 11/1954 | Goschel | 123—32 |
| 2,724,371 | 11/1955 | Mallory | 123—32 |
| 2,717,582 | 9/1955 | Scherenberg | 123—32 |
| 2,893,360 | 7/1959 | Muller | 123—32 |
| 3,154,059 | 10/1964 | Witsky et al. | 123—32STR |
| 3,283,751 | 11/1966 | Goossak et al. | 123—32 |
| 3,294,072 | 12/1966 | Simko et al. | 123—32STR |
| 3,318,292 | 5/1967 | Hideg | 123—32 |

OTHER REFERENCES

A Study of The Swirl Stratified Combustion Principle by J. E. Witsky and J. M. Clark, Jr., SAE paper 660092, 485 Lexington Ave., New York 17, N.Y., pp. 21 and 22.

LAURENCE M. GOODRIDGE, Primary Examiner

U.S. Cl. X.R.

123—65